United States Patent
Bergkvist et al.

(10) Patent No.: US 6,313,570 B1
(45) Date of Patent: Nov. 6, 2001

(54) HIGH INTENSITY GAS DISCHARGE AIRCRAFT LIGHTING

(76) Inventors: Lars Anders Bergkvist, Vestmansvagen 16, 89421 Sjalevad; Kjell Kristoffer Bergkvist, PL 3215 Sormesunda, 89591 Bredbyn, both of (SE)

( * ) Notice: Subject to any disclaimer, the term of this patent is extended or adjusted under 35 U.S.C. 154(b) by 0 days.

(21) Appl. No.: 09/252,157

(22) Filed: Feb. 18, 1999

(51) Int. Cl.$^7$ ...................................................... H01J 5/16
(52) U.S. Cl. .................................................. 313/113; 362/148
(58) Field of Search ........................... 313/113; 362/148, 362/365, 265, 285, 419

(56) References Cited

U.S. PATENT DOCUMENTS

| | | |
|---|---|---|
| 4,200,903 | 4/1980 | Koenig et al. . |
| 4,430,597 * | 2/1984 | Thompson ............................ 313/113 |
| 5,030,889 | 7/1991 | El-Hamamsy et al. . |
| 5,113,330 | 5/1992 | Makita . |
| 5,119,275 | 6/1992 | Makita . |
| 5,355,290 | 10/1994 | Tickner . |
| 5,709,450 | 1/1998 | Francis et al. . |
| 5,738,436 | 4/1998 | Cummings et al. . |

FOREIGN PATENT DOCUMENTS

| | | | |
|---|---|---|---|
| 0 374 846 | 6/1990 | (EP) . | |
| 0374846 * | 6/1990 | (EP) | ....................................... 362/61 |
| 2 704 938 | 11/1994 | (FR) . | |
| 2 714 454 | 6/1995 | (FR) . | |
| 933 345 | 4/1960 | (GB) . | |
| 933345 * | 8/1963 | (GB) | ....................................... 362/61 |
| WO92/04580 * | 8/1963 | (WO) | ....................................... 362/61 |
| 92/04580 | 3/1992 | (WO) . | |

* cited by examiner

*Primary Examiner*—Nimeshkumar D. Patel
*Assistant Examiner*—Todd Reed Hopper
(74) *Attorney, Agent, or Firm*—Renner, Otto, Boisselle & Sklar LLP

(57) ABSTRACT

An HID lamp assembly has a relatively small envelope size enabling use of the lamp assembly in aircraft applications as well as other applications. The lamp assembly comprises a reflector, a discharge lamp mounted to the reflector, and a ballast which controls the delivery of power to the discharge lamp. The ballast is mounted to and carried by the reflector, at least partially surrounds a base of the discharge lamp, and is axially aligned with the reflector. The transverse dimensions of the ballast are less than the corresponding dimensions of the reflector at a wide front end thereof.

14 Claims, 3 Drawing Sheets

HIGH INTENSITY GAS DISCHARGE AIRCRAFT LIGHTING

The invention herein described relates generally to high intensity gas discharge lamp assemblies and more particularly to such lamp assemblies that are compact for aircraft lighting applications

BACKGROUND OF THE INVENTION

High intensity discharge (HID) lamps offer significant advantages over other lamps conventionally used in aircraft applications, such as quartz halogen or incandescent sealed beam lamps used as utility/cargo bay lights, wing and engine scan lights, logo lights, landing lights and taxi lights. When compared with quartz halogen lamps, HID lamps provide (i) nearly twice the photometric performance at less than half the energy consumption, (ii) extended lamp life by a factor of about four, (iii) better shock resistance and (iv) less heat generation. However, presently known HID lamp assemblies have required a larger envelope than the existing quartz halogen or incandescent sealed beam lamps presently in use in aircraft applications. Even automotive applications would benefit from a HID lamp assembly having a smaller envelope size than the HID lamp assemblies presently in use.

SUMMARY OF THE INVENTION

The present invention provides an HID lamp assembly that has a relatively small envelope size enabling use of the lamp assembly in aircraft applications as well as other applications. According to one aspect of the invention, a lamp assembly comprises a reflector; a discharge lamp mounted to the reflector; and a ballast which controls the delivery of power to the discharge lamp, the ballast being mounted to and carried by the reflector.

According to another aspect of the invention, a lamp assembly comprises a reflector that tapers from a wide front end to a narrow rear end; a discharge lamp mounted to the rear end of the reflector; and a ballast which controls the delivery of power to the discharge lamp, the ballast being axially aligned with the reflector and the transverse dimensions of the ballast being less than the corresponding dimensions of the reflector at its wide front end.

According to a further aspect of the invention, a lamp assembly comprises a reflector; a discharge lamp including a discharge lamp bulb and a bulb base mounted to the reflector; and a ballast which controls the delivery of power to the discharge lamp, the ballast at least partially surrounding the bulb base.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION

Figure 1:
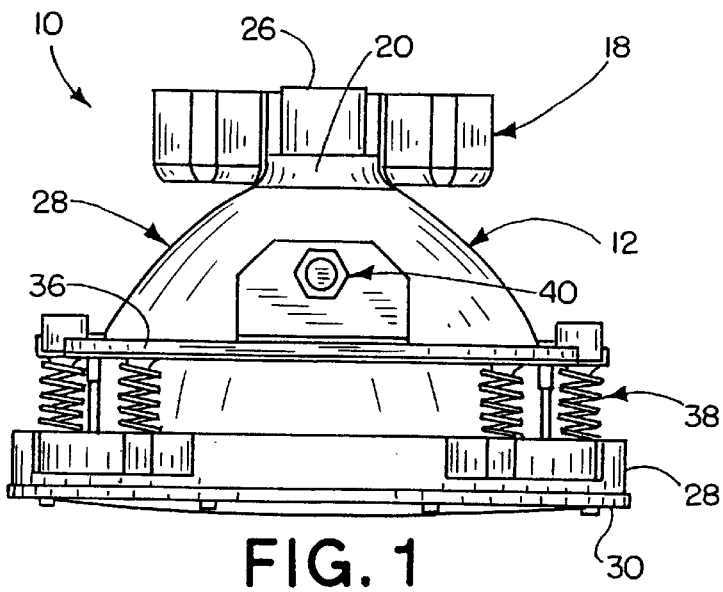
FIG. 1 is a top view of an exemplary HID lamp assembly according to the invention, configured for use as an aircraft landing light.
Figure 2:
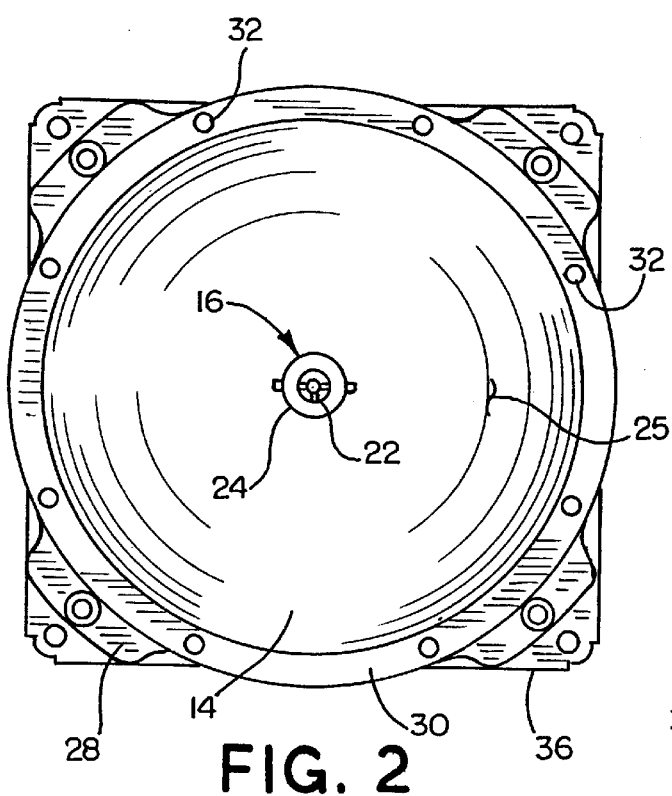
FIG. 2 is a front elevation view of the HID lamp assembly of FIG. 1.
Figure 3:
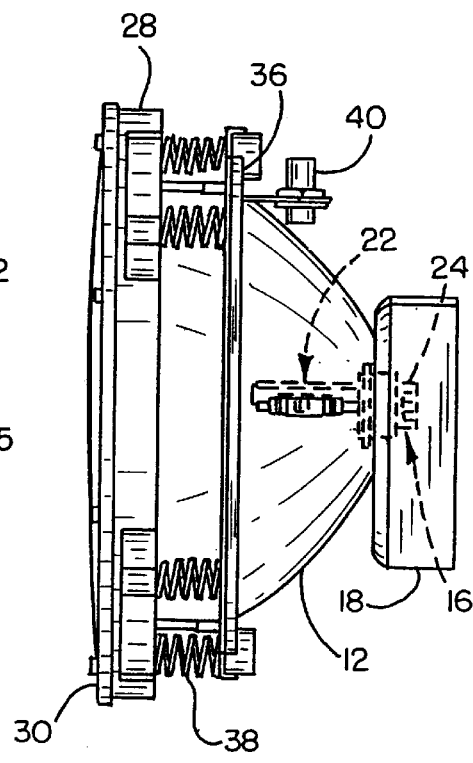
FIG. 3 is a side elevational view of the HID lamp assembly of FIG. 1.
Figure 4:
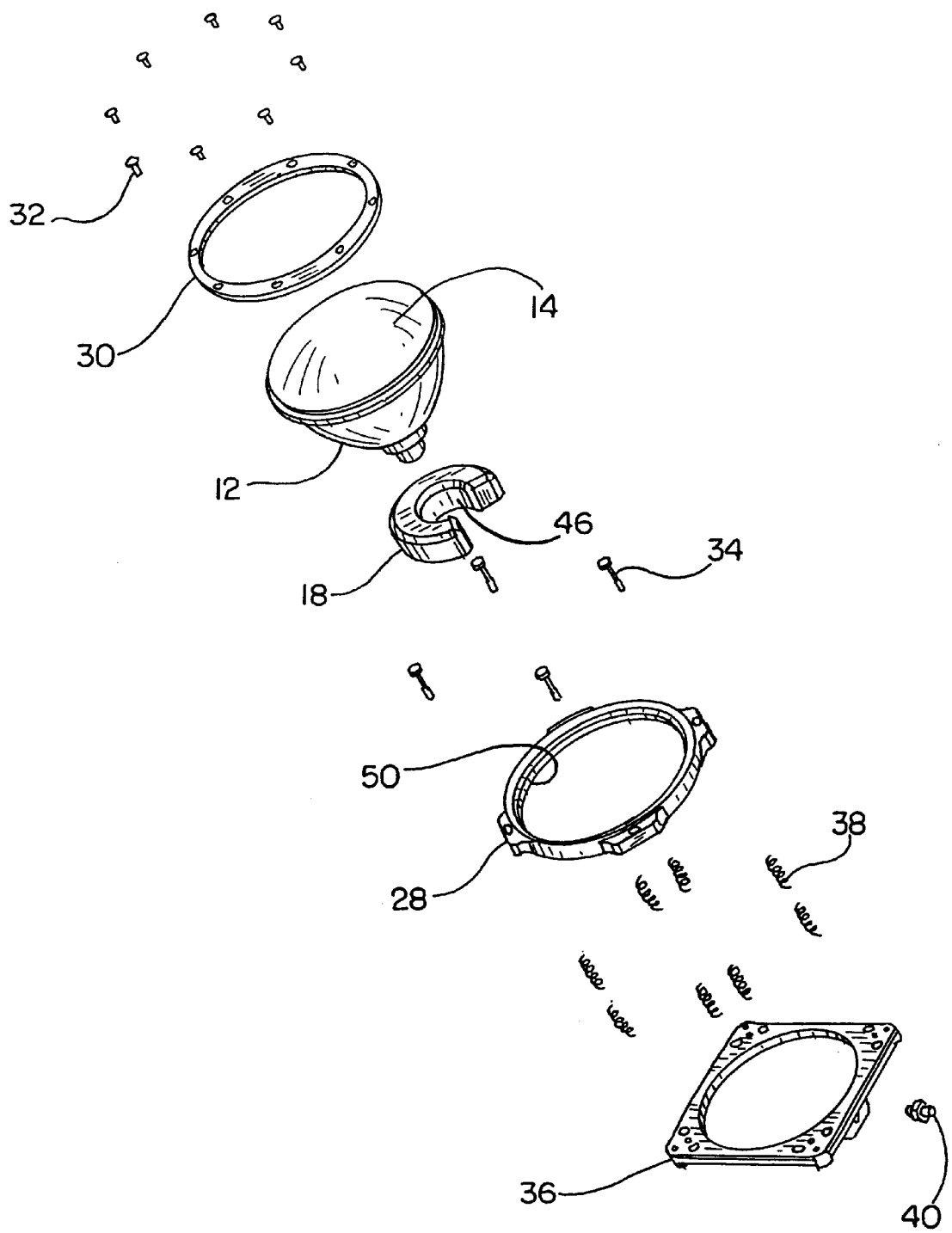
FIG. 4 is an exploded perspective view of the HID lamp assembly of FIG. 1.

Referring now in detail to the drawings and initially to FIGS. 1–4, an exemplary HID light assembly according to the invention is designated generally by reference numeral 10. The HID light assembly comprises a reflector 12, a cover lens 14, an HID lamp 16 and a power control unit 18. The reflector 12 may be a parabolic reflector as shown and the lens 14 closes the front end of the reflector. In an alternative arrangement, the reflector may include a reflector housing including a reflector surface therein.

In the illustrated embodiment, the HID lamp 16 is inserted into the reflector 12 through a hole in the rear end portion or base of the reflector. The HID lamp 16 includes a bulb 22 and a base 24. The base is secured in place by a suitable potting compound with the bulb preferably located at the focal point of the reflector within the interior lamp chamber of the reflector. The front or open end of the reflector is closed by the cover lens 14. Together, the reflector and cover lens preferably form a closed interior space or chamber 25. This chamber 25 preferably is filled with an inert gas such as helium or carbon dioxide. The inert gas prevents moisture accumulation on interior surfaces of the reflector 12 and lens 14 and furthermore precludes oxidative degradation of reflective materials employed on the reflector. Additionally, the inert gas fill provides enhanced thermal transport from the lamp 22 to the reflector 12, thereby permitting the use of lamps 22 with higher optical output than can be realized with a vacuous or ambient atmosphere.

The rear end of the base may be configured to form an electrical connection device, such as a plug, for mating with a mating connection device, such as a socket 26, for effecting electrical connection between the HID lamp and the power control unit 18. The socket 26, or other electrical connector connected by leads to the ballast, facilitates assembly and disassembly of the HID lamp with respect to the other components of the light assembly 10.

The reflector 12, lens 14 and HID lamp 16 form a subassembly 28 that is attached to a mounting frame or flange 28 by a lens retainer 30 and fasteners 32, as may be desired for use of the HID light assembly 10 as a landing light. The mounting frame 28 is attached by mounting/adjusting screws 34 to a mounting plate 36 used to install the HID light assembly 10 onto an aircraft, as in place of a conventional light assembly (the HID light assembly may have the same or similar envelope size as an existing conventional halogen or incandescent light assembly). A plurality of springs 38 are interposed between the mounting frame and mounting plate to form a spring-mount system that allows for aiming adjustments. The mounting plate may have mounted thereto an electrical connector 40 which may be connected to an external power supply by a mating connector. The electrical connector 40 is connected by leads (not shown) to the power control unit 18 for supplying power to the power control unit.

The power control unit 18 includes power delivery circuits and a microprocessor (or equivalent monitor and control circuit) for overall control and supervision of the HID lamp 16 and power control unit. For ease in reference, the power control unit is herein referred to as the power supply or ballast, as such unit is also known. For purposes of the present invention, the ballast may use conventional or other suitable circuitry for controlling the operation of the HID lamp.

In accordance with the invention, the ballast 18 is attached to the reflector 12, and particularly the base 20 of the reflector, whereby the ballast is integrated into the reflector-lens-lamp subassembly 28. The ballast is nested on the rear of the parabolic reflector and at least partially surrounds the base 24 of the HID lamp 16 and the connector 26 that provides for electrical connection between the HID lamp and the ballast. In an alternative embodiment, the ballast may be integrated into or onto the lamp base 24 for indirect mounting of the ballast to the reflector.

In the illustrated light assembly 10, the ballast has an annular (or torroidal) configuration with a central hole 46 (FIG. 4) which receives the portion of the lamp base 24 (and also the connector) protruding from the base 20 of the reflector. As needed to accommodate the necessary circuitry, the ballast may completely surround the lamp base or may extend only partially around the lamp base. In the illustrated embodiment, the ballast extends only partway around the lamp base and thus has a crescent shape. The ballast may have other configurations while still remaining nested with respect to the reflector and HID lamp.

Regardless of its shape, the ballast 18 is contained within an cylindrical envelope having a radius no greater than the radius of the reflector 12 at its front end. That is, the transverse dimensions of the ballast are less than the corresponding transverse dimensions of the reflector at its open end. More preferably, the ballast is externally dimensioned so that it can pass through the central opening 50 in the mounting flange 28 so that the subassembly 28 can be assembled to the mounting flange as a unit. Moreover, the ballast does not project significantly beyond the rear end of the lamp base and connector structure 26, if at all. As shown, the ballast extends beyond the rear of the reflector less than one half the axial length of the reflector. The central region of the ballast is sized to accommodate the lamp base and connector 26 and any necessary electrical wiring running from the lamp base and/or connector to the ballast. Preferably, the axial length of the ballast is no greater than twice the amount that the lamp base projects behind the base of the reflector.

As is known in the art, the ballast 18 controls operation of the HID lamp, including the illuminating power and light output stability, through a microprocessor (or equivalent control and monitor circuit). It also controls the lamp voltage during continuous or steady state operation. The HID lamp ballast may operate on 115 VAC 400 Hz single phase power, for example. Lamp ignition may be effected by applying to the HID lamp a burst comprising a series of high voltage pulses within a finite time period of 200 ms, for example. The bursts may be immediately truncated the moment the lamp is lit. The bursts may be repeated once each second if the lamp fails to light. In the case of a missing or malfunctioning lamp, the igniter (forming part of the ballast) may stop after a preset time, typically 15 seconds. Then further attempts to re-light the lamp may be discontinued until, for instance, the main power has been manually cycled.

The monitor and control circuits in the ballast may detect when the lamp is lit at which time an alternating constant current, for example 1.5 Amps, may be applied to the HID lamp. The frequency may be 250 Hz, for example. When the lamp is cold, the lamp voltage may be between 25–30 Volts. During this mode, the ballast may run in constant current mode and the lamp voltage may be continuously monitored. The constant current mode may stay in effect until the HID's lamp voltage exceeds 40–45 Volts, for example, which means the lamp power has reached a peak that may be just over 60 Watts, at 1.5 Amps for a 50 Watt lamp. As the lamp voltage increases above, for example, 40–45 Volts, the microprocessor (or equivalent monitor and control circuit) may select constant power mode and stabilize the power at, for example, 50 ±2.5 Watts. The microprocessor (or equivalent) circuit may continue to monitor lamp voltage as described below.

Prior to lamp ignition and during the entire operating cycle, the microprocessor (or equivalent) circuit may monitor the lamp for short or open circuit situations. A lamp voltage below, for example, 15 Volts may be considered a short circuit and the microprocessor (or equivalent) circuit may go into a fail safe routine. Under short circuit conditions the output current may be limited to 0.5 Amps, for example. A lamp voltage of over 120 Volts, for example, may be considered an open circuit. The microprocessor (or equivalent) circuit may move to a fast-restrike mode and attempt to restart the lamp. In the fast-restrike mode, ignition bursts are applied as in the startup phase, however lamp voltage and current are controlled by the microprocessor (or equivalent) as required to sustain lamp function.

The foregoing arrangement enables an HID lamp assembly to have an envelope size about equal or less than an existing quartz halogen or incandescent sealed beam lamp of comparable light output. Accordingly, the above described self-contained HID lamp assembly can be installed in the same space as, and thus in place of, an existing quartz halogen or incandescent sealed beam lamp in an aircraft.

Figure 5:
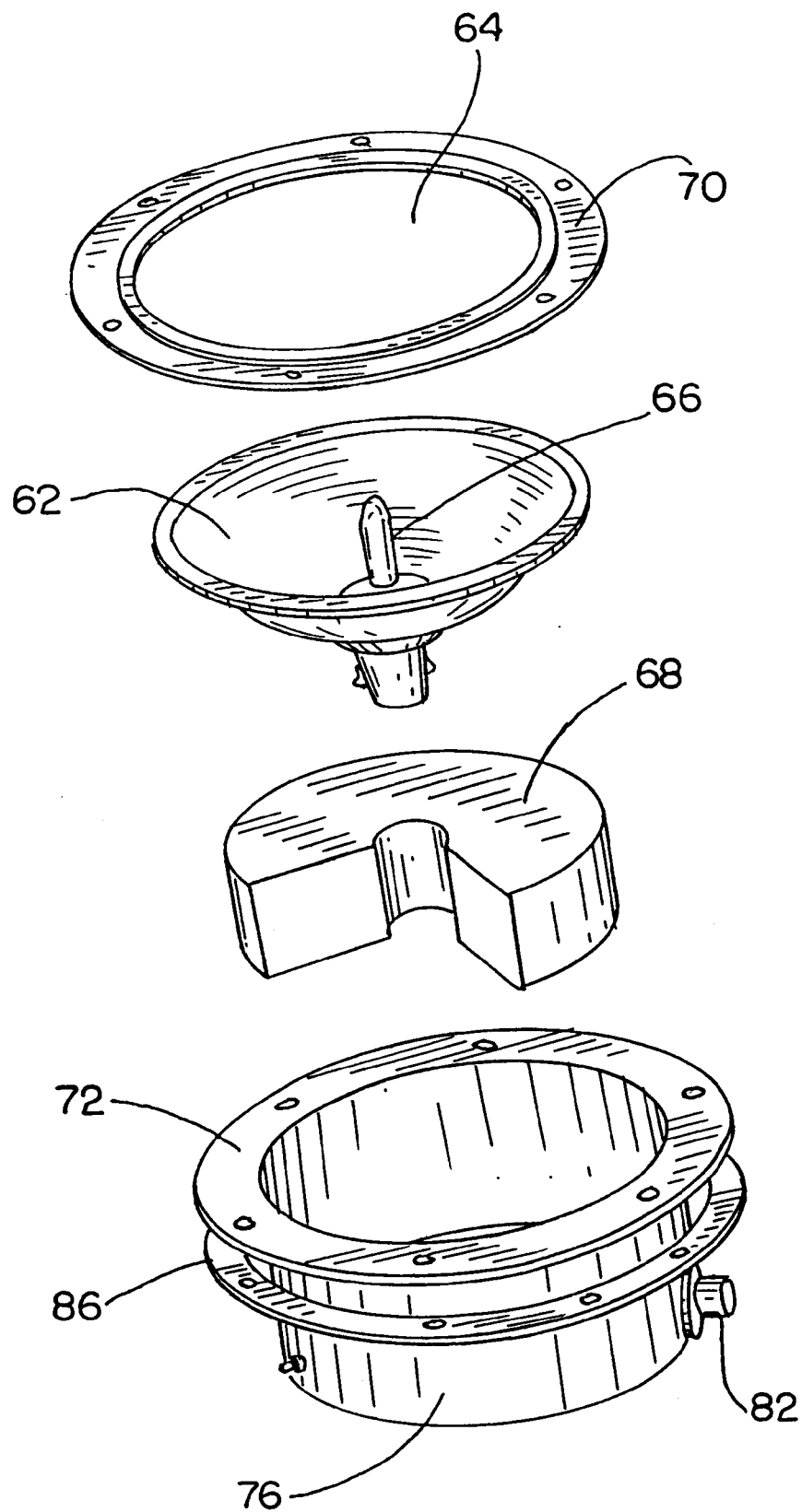
FIG. 5 is an exploded perspective view of another HID lamp assembly according to the invention, configured for use as a logo light.

Referring now to FIG. 5, another embodiment of a HID light assembly is designated generally by reference numeral 60 and shown in exploded view. The HID light assembly 60 is configured for use as a logo light on an aircraft. The light assembly 60 is similar to the light assembly 10 of FIGS. 1–4, the assembly including a reflector 62, a cover lens 64, HID lamp 66, ballast 68 and lens bezel 70. The light assembly also includes a mounting flange 72, but unlike the mounting flange 28 of the light assembly 10, the mounting flange 72 is provided on an enclosure 76. The enclosure 76 may be a can having a cylindrical wall closed at its rear end and open at the front end from which the mounting flange extends radially outwardly. The can encloses the reflector, HID lamp and ballast, and has the cover lens secured thereto by the lens bezel. The can has mounted to the side wall thereof an electrical connector 82 which may be connected to an external power supply by a mating connector. The electrical connector 82 is connected by leads (not shown) to the power control unit 68 for supplying power to the power control unit. The main body of the enclosure or can extends through an opening in a mounting plate 86 used to install the HID light assembly 10 onto an aircraft. The mounting flange 72 may be attached to the mounting plate as above described by a spring-mount system (not shown) that allows for aiming adjustments.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A lamp assembly comprising:

a reflector;

a discharge lamp mounted to the reflector; and a ballast which controls the delivery of power to the discharge lamp, the ballast being mounted to and carried by the reflector, and wherein the discharge lamp includes a discharge lamp bulb and a bulb base, the ballast has an annular configuration defining a central hole into which the bulb base projects from the rear of the reflector, and the ballast extends only part-way around the bulb base.

2. A lamp assembly as set forth in claim 1, wherein the reflector has an open end, and a lens closes the open end of the reflector.

3. A lamp assembly as set forth in claim 1, wherein the reflector tapers from a wide front end to a narrow rear end, and the transverse dimensions of the ballast are less than the corresponding dimensions of the reflector at its wide front end.

4. A lamp assembly as set forth in claim 1, wherein the reflector has an open end, and a lens closes the open end of the reflector and forms therewith a sealed chamber.

5. A lamp assembly as set forth in claim 4, wherein an inert gas fills the sealed chamber.

6. A lamp assembly as set forth in claim 5, wherein the discharge lamp bulb is disposed within the sealed chamber.

7. A lamp assembly comprising:

a reflector that tapers from a wide front end to a narrow rear end;

a discharge lamp mounted to the rear end of the reflector; and a ballast which controls the delivery of power to the discharge lamp, the ballast being axially aligned with the reflector and the transverse dimensions of the ballast being less than the corresponding dimensions of the reflector at its wide front end, and wherein the discharge lamp includes a discharge lamp bulb and a bulb base, the ballast has an annular configuration defining a central hole into which the bulb base projects from the rear of the reflector, and the ballast extends only part-way around the bulb base.

8. A lamp assembly as set forth in claim 7, wherein the reflector is open at its wide front end, and a cover lens closes the open end of the reflector.

9. A lamp assembly as set forth in claim 7, wherein the reflector has an open end, and a lens closes the open end of the reflector and forms therewith a sealed chamber.

10. A lamp assembly as set forth in claim 9, wherein an inert gas fills the sealed chamber.

11. A lamp assembly as set forth in claim 10, wherein the discharge lamp bulb is disposed within the sealed chamber.

12. A lamp assembly comprising:

a reflector;

a discharge lamp including a discharge lamp bulb and a bulb base mounted to the reflector; and a ballast which controls the delivery of power to the discharge lamp, the ballast having a crescent shape extending only part-way around the bulb base.

13. A lamp assembly as set forth in claim 12, wherein the reflector has an open end, and a lens closes the open end of the reflector and forms therewith a sealed chamber.

14. A lamp assembly as set forth in claim 13, wherein an inert gas fills the sealed chamber.

* * * * *